Aug. 13, 1929.  B. E. CLARKE  1,724,562
CHLORINIZED AND OZONIZED TOPICAL REMEDY AND PROCESS OF MAKING SAME
Filed Dec. 10, 1925  2 Sheets-Sheet 2
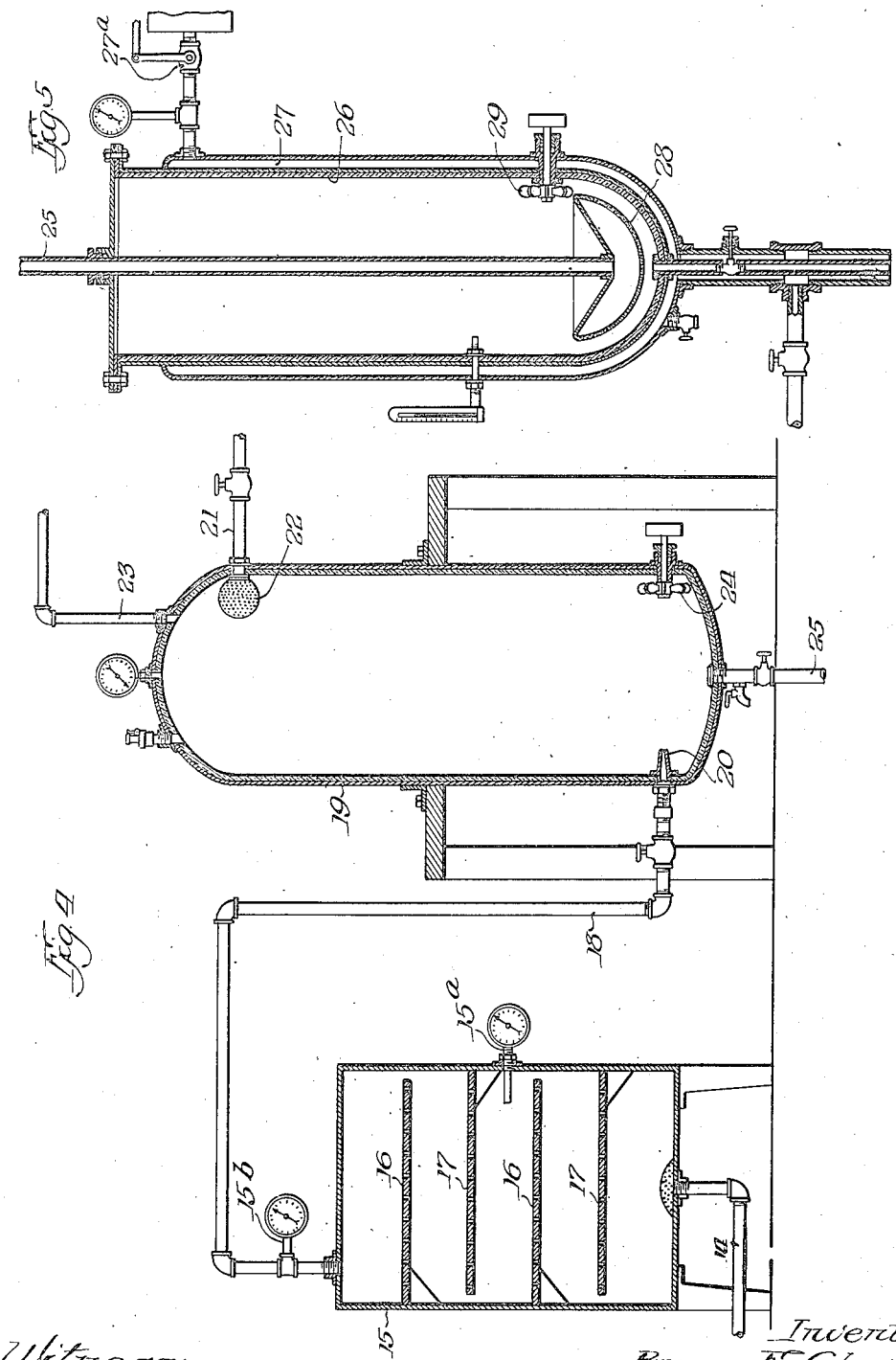

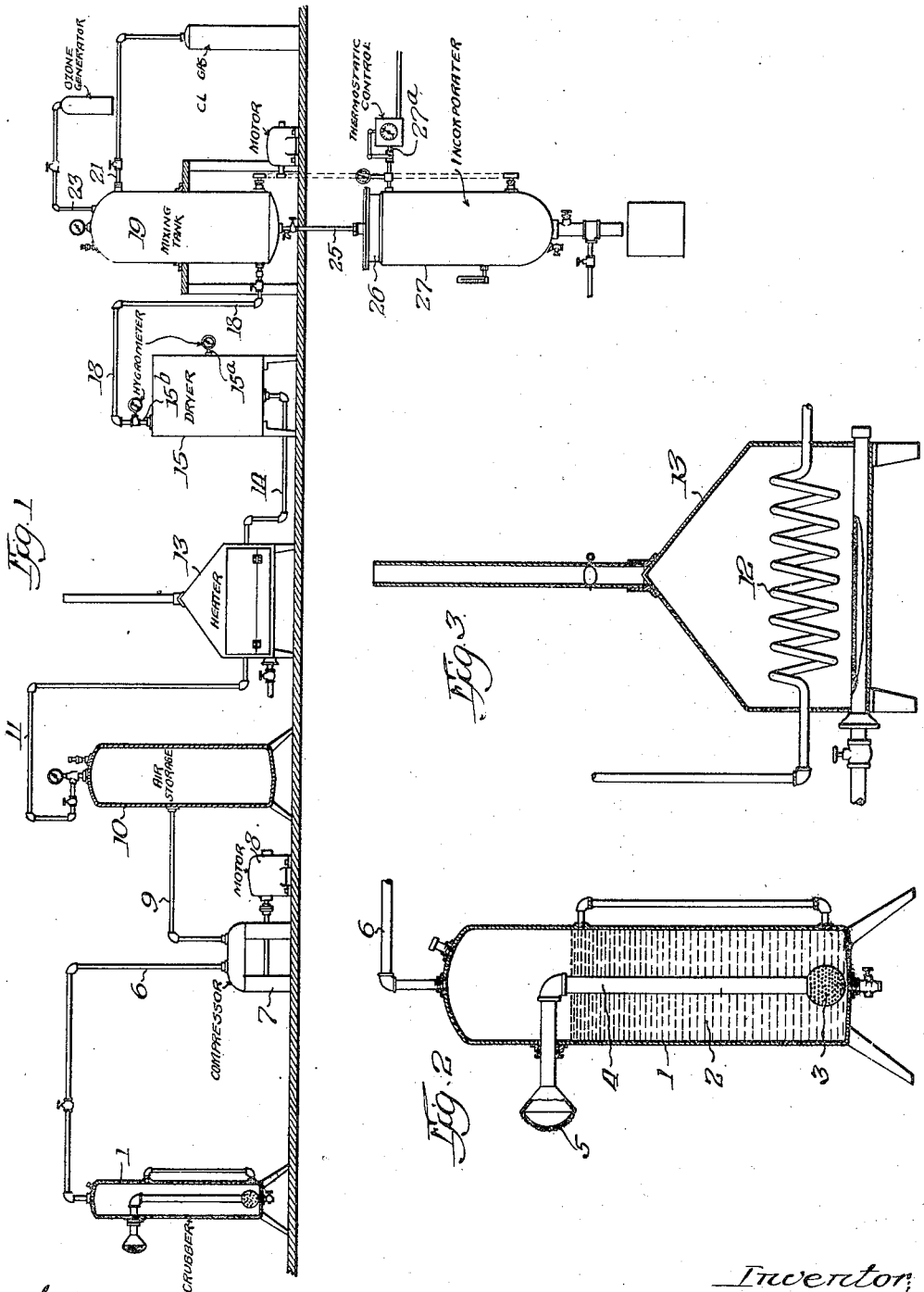

Patented Aug. 13, 1929.

1,724,562

UNITED STATES PATENT OFFICE.

BRUCE E. CLARKE, OF KANSAS CITY, MISSOURI.

CHLORINIZED AND OZONIZED TOPICAL REMEDY AND PROCESS OF MAKING SAME.

Application filed December 10, 1925. Serial No. 74,484.

This invention relates to a topical remedy for human use, and is based upon the discovery that ozone and chlorine, each of which has heretofore been recognized as being of therapeutic and germicidal value in the treatment of diseased tissues, will, if used conjointly for such purposes, have an effect which is greater than the mere individual effects of the two ingredients, in that the chlorine acts upon the diseased parts in a manner to prepare the same for or render them especially susceptible to the effects of the oxygen and ozone. That is to say, the chlorine, acting upon, for instance, tissues of the respiratory passages which are infected with cold, flu and other germs, has the effect of stimulating the flow of lymph and cleansing the mucous surfaces which in turn causes the organisms to come to the surfaces and within reach of the ozone, which thereupon produces its effect of oxidation and destruction of the germs; this effect being in addition to the known germicidal effect of chlorine. More specifically stated, chlorine acts as a powerful germicide on account of its affinity for hydrogen and the consequent release of nascent oxygen when it comes into contact with micro-organisms in a moist condition, but the amount of this oxygen is limited. Hence, by combining ozone directly with the chlorine the efficiency of each gas is materially increased.

The object of the invention is to develop a topical remedy which can be conveniently manipulated and locally applied, and which will act, when heated either by the temperature of the surfaces to which applied or by the application of extraneous heat, to liberate chlorine and ozone or oxygen, or both, in uncombined form against the surfaces to be treated; to which end, one feature of the invention consists in treating a suitable vehicular element, for instance, a fatty base material of oil or viscous consistency, such as sweet oil, cocoa butter, cocoanut oil, or other vegetable fats, vaseline, or other like mineral fats, lard or other animal fats, and, in short, any carbohydrate that is suitable for use as a topical remedy or vehicle for a topical remedy, and which will not react chemically with ozone and chlorine to produce derivitives thereof, as distinguished from bearing these gases in free state; and treating such a vehicular element in a manner to develop molecular adhesion of the gas to the vehicle, for instance, by thoroughly impregnating the vehicle with the gases while the vehicle is at a temperature which renders extreme subdivision practicable, and while it is being thoroughly agitated and subjected to bombardment by the gases. By the expression "uncombined, or free chlorine and ozone," the applicant means that both chlorine and ozone liberate nascent oxygen as a product of their reaction, which liberation of nascent oxygen from ozone greatly enhances the action of the nascent oxygen liberated by chlorine alone.

Another feature of the invention resides in a topical remedy consisting of a vehicular element of the kind described together with the two gases, chlorine and ozone or oxygen, or both, incorporated therewith in uncombined state and under conditions which release them for reaction with the parts to be treated, when the vehicle is melted by the heat of the surfaces to which the remedy is applied; or, if preferred, is subjected to extraneous heat sufficient to release the gases by ebullition. While ozone in free state is preferable as the oxidizing agent, oxygen in uncombined state may be employed with appreciably beneficial results. Hence, the mention of either oxidizing element herein is to be taken as including the other such element, or both of them.

In order that the invention may be fully understood, an illustrative method of procedure will be described in detail, in connection with the accompanying drawings, in which apparatus suitable for practicing the process is schematically shown.

In said drawings—

Figure 1 is a layout of a complete set of apparatus including means for purifying, heating, and drying air for use as a diluent, means for mixing such prepared air with chlorine and ozone in predetermined proportions, and means for maintaining a vehicular element at a temperature suitable to facilitate its agitation and subdivision, and permeating the same with the mixture of air, chlorine, and ozone and causing the chlorine and ozone to be incorporated therewith.

Figure 2 is a vertical section of an air scrubber;

Figure 3 is a similar view of an air heater;

Figure 4 shows in vertical section an air drier and means for mixing air supplied therefrom with chlorine and ozone; and Figure 5 is a vertical sectional view of a water jacketed mixing tank suitable for incorporating the chlorine and ozone gases, diluted with air, in the carbohydrate vehicle.

Referring to the drawings in detail, 1 represents an air scrubber containing a body 2 of water or other cleansing liquid, and communicating with atmosphere through means of a submerged spray bulb 3 and pipe 4, which latter has its outer end protected by a strainer 5 of approved construction, such, for instance as a covering of silk protected by wire gauze; the effect in said scrubber 1 being to admit air in finely subdivided streams into the lower portion of a body of water 2, whenever there is a sufficient drop of internal pressure in the scrubber due to suction on its outlet pipe 6. 7 represents an air compressor operated by a motor 8 having its suction port or intake connected with the pipe 6 leading from the scrubber 1, and having a pipe 9 through which it discharges purified air under pressure, leading to a storage tank 10. Discharge pipe 11 leading from air storage tank 10 discharges through a coil 12 (Figure 3) in a heater 13 where the air under compression is heated to a temperature which will render it more readily dried, and from the heater 13 the air passes through a pipe 14 to a drier 15 of known construction, such, for instance, as shown in Figure 4, wherein 15 represents the shell of the drier equipped with hygrometers $15^a$, $15^b$ and 16, 17 represent shelves arranged as baffles over which the air must take a circuitous course in reaching the air outlet, and upon which baffles a suitable moisture-absorbing substance is placed, for instance, quicklime, or a mixture of sodium carbonate and lime prepared in a known manner to render it efficient as an absorbent of moisture. From the drier 15 air under pressure, heated and dried, passes by way of a pipe 18 to a gas mixing tank 19. This tank, as shown in Figure 4, receives hot dry air through a jet nozzle 20, chlorine in uncombined form through a pipe 21 and atomizing bulb 22, and ozone through a pipe 23. Such gas mixing tank also contains an agitator 24, preferably near the bottom and designed to have the effect of maintaining internal circulation of sufficiently violent form to insure thorough mingling of the chlorine and ozone and dilution of the same with the admitted air. From the gas mixing tank 19, the mixture of air, chlorine, and ozone passes by way of pipe 25 to a closed incorporating chamber 26 where the gases chlorine and ozone, which are to be incorporated in the vehicular element and which are borne upon the diluent body of air, are caused to thoroughly mingle with the vehicular element until the latter becomes saturated with the chlorine and ozone. Incorporating tank 26 has a heating jacket 27 for hot water or steam, as may be desired, through means of which the temperature of the tank is kept at a degree which renders the vehicular element best suited for saturation by the gases to be incorporated therewith; and in order that the gases may be caused to thoroughly permeate all parts of the body of melted vehicular element within the tank, the mixture of air and gases passes to the bottom of the tank and is there liberated in minute and numerous streams of subdivision through means of the spray device 28. Further than this, the incorporating tank 26 is equipped with an agitator 29 which keeps the heated vehicle in circulation and thus brings all parts thereof alike under the influence of the impregnating gases. Tank 26 being jacketed for maintenance of temperature has its heating element, for instance, steam, regulated by a thermostatically controlled valve $27^A$ of any suitable known construction.

Scrubbing the air removes the impurities carried in suspension therewith, while drying it removes the moisture which would otherwise react with the uncombined chlorine to produce hydrochloric acid and render the product objectionable both for therapeutic reasons and by reason of effect upon the fatty vehicle. Heating the air facilitates thorough commingling of the gases therewith, and keeping the air under pressure facilitates the ultimate incorporation of the gases with the vehicle.

The admission of chlorine and ozone to the gas mixing chamber 19 will be regulated so as to make the chlorine in the proportion of from .015 to .02 milligrams of chlorine to one liter of air or approximately, one part chlorine to one hundred thousand parts of air; and the ozone in the proportion of one part of ozone to twenty thousand parts of air. In proportioning the active principles of the product, namely, the chlorine and ozone gases to the vehicular element, the latter will be charged into the incorporating tank 26 in such quantity as will admit of thorough agitation and the provision of a reasonable expansion space over the mass, and the gases with their air diluent will be charged into the incorporating tank for such length of time as will be found by experience to develop saturation of the vehicle with the gases chlorine and ozone. As one suitable carbohydrate or fatty vehicle for producing the article and practicing the process herein taught vaseline is suggested, and this is particularly desirable as a vehicle when the product is to be applied locally, since the heat of the surfaces to which it is applied melts the vehicle and so releases the active ingredients for reaction upon the parts to be treated. But other vehicles melting under body temperatures, for instance, cocoa butter, lard, etc., may be employed; or, for some purposes, vehicular elements that stand in a state of fusion at normal atmospheric temperatures may be employed. Hence, it is to be understood that the invention is not limited to the use of any particular vehicular element. Nor is the invention limited to use with a vehicular element that is applied to the parts to be treated. Preparation may be made of a kind in which the active ingredients are driven off from the vehicle by the application of extraneous heat, conveyance of the active principle to the surfaces to be treated being through inhalation or otherwise, and being facilitated in some instances by volatilization of a portion of the vehicle itself so as to deposit some of the vehicle upon the surfaces and thus confine the active principle of the remedy to the surfaces until it has time to react.

Among other important advantages attained by the use of the product of the present invention, are that the irritating effect of the chlorine on the capillaries causes a primary brief constriction followed by a much longer dilation. The increased blood rush incident to such dilation reduces congestion. The ozone increases the haemoglobin of the blood thereby doubling its oxygen carrying capacity. Hence, this increased blood rush is conducive to greater oxygen absorption.

The irritating and acrid discharges from the nasal passage, which always attends colds, flu, whooping cough, etc., are rendered less irritating and are quickly dried up by the ozone contained in this product.

I claim:—

1. As a new article of manufacture, a topical remedy, consisting of a vehicular element, and chlorine and a gas capable of producing nascent oxygen incorporated therewith.

2. As a new article of manufacture, a fatty vehicular element having chlorine and ozone incorporated therewith.

3. As a new article of manufacture, a topical remedy, consisting of a vehicular element, and chlorine and ozone, both in uncombined form, incorporated therewith.

4. As a new article of manufacture, a topical remedy, consisting of a fusible vehicular element having chlorine and ozone incorporated therewith.

5. The method of producing a chlorinizing and oxidizing topical remedy, which consists in mixing oxygen and chlorine elements in uncombined form with a diluent body of air, and then permeating a vehicular element with a mixture of air, chlorine gas and oxygen-producing gas and causing the said gases to become incorporated in their uncombined state with the vehicular element.

6. The method of producing a chlorinizing and oxidizing topical remedy, which consists in mixing dry heated air with uncombined chlorine and ozone, thoroughly mingling the mixture of air, chlorine and ozone with a vehicular element while the latter is in fused state, and causing the chlorine and ozone in their uncombined state to become incorporated with said vehicular element.

Signed at Chicago, Illinois, this 3rd day of December, 1925.

BRUCE E. CLARKE.